(No Model.)
C. F. BRUSH.
SECONDARY BATTERY.
No. 260,653.  Patented July 4, 1882.
     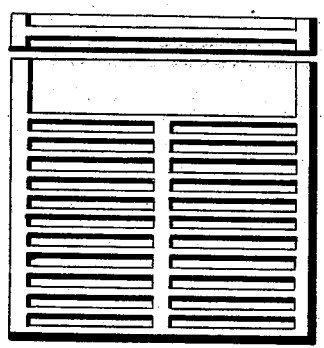 
Fig.1.  Fig.2.  Fig.3.  Fig.4.  Fig.5.  Fig.6.  Fig.7.
Fig. 8.
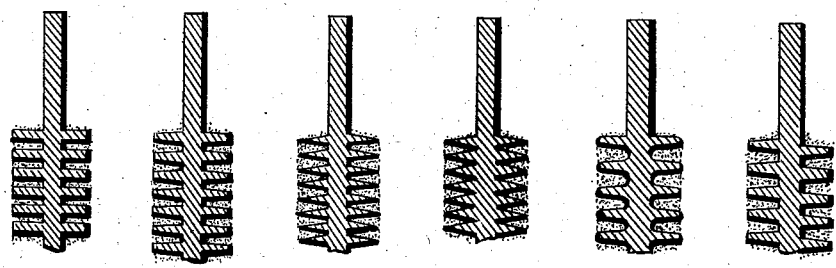
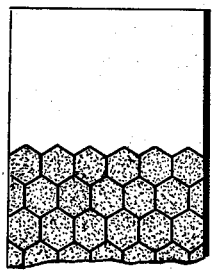  Fig. 9.   Fig. 10. 
WITNESSES
INVENTOR
Charles F. Brush
By Leggett & Leggett,
Attorneys

UNITED STATES PATENT OFFICE.

CHARLES F. BRUSH, OF CLEVELAND, OHIO.

SECONDARY BATTERY.

SPECIFICATION forming part of Letters Patent No. 260,653, dated July 4, 1882.

Application filed June 15, 1882. (No model.)

*To all whom it may concern:*

Be it known that I, CHARLES F. BRUSH, of Cleveland, in the county of Cuyahoga and State of Ohio, have invented certain new and useful Improvements in Secondary Batteries; and I do hereby declare the following to be a full, clear, and exact description of the invention, such as will enable others skilled in the art to which it pertains to make and use the same.

My invention relates to an improvement in secondary batteries, the object being to provide an element for secondary batteries of such form and construction that they will expose great surface for the application of the active coating, and be of such form and configuration as to retain the active coating in contact therewith.

With these ends in view my invention consists essentially in a secondary battery element consisting of a structure of etagère-like form, containing in the spaces between its shelves lead in a finely-divided state.

In the accompanying drawings, Figure 1 is an edge view of a corrugated plate having finely-divided lead in its grooves or supported on its shelves. Fig. 2 is an end view of a ribbed plate having finely-divided lead inserted in its cells or grooves. Fig. 3 is an edge view of an angularly-corrugated plate. Fig. 4 shows two angularly-corrugated plates with their folds entering each other. Fig. 5 is an end view, and Fig. 6 is a plan view, of a ribbed plate. Fig. 7 is a vertical section of a perforated or slotted plate. Fig. 8 represents different forms of ribbed plates. Fig. 9 shows a honeycombed plate, and Fig. 10 a ribbed corrugated plate.

In Fig. 1, A is a corrugated plate, of lead or other suitable metal, having a coating, *b*, of granular, porous, spongy, or finely-divided lead applied thereto.

The lead may be retained in place by means of a sheet of heavy paper, or card-board, or cloth, or felt, or equivalent substance, secured in place by ties, rivets, or binding-strips of metal or wood.

The granular lead may be spread on the plate and made to adhere by ramming or pressing the lead into the corrugations or grooves, and when this is done no supporting cloth or layer will be found necessary.

The other forms of plates shown in the drawings may have the lead coating applied thereto in the manner described.

When a pair of plates such as I have described are associated together to form a secondary battery and immersed in dilute sulphuric acid and charged by the passage of an electric current in the usual manner one of the plates absorbs a large quantity of hydrogen, while the other plate has its spongy or granulated portions peroxidized, and thus forms the oxygen element of the battery. The hydrogen or unchanged plate is apt, however, to deteriorate by use, and better results may often be obtained by peroxidizing both the plates and afterward reversing or reducing one of them to form the hydrogen element of the battery.

I prefer to proceed as follows in "forming" the plates: I take any number of the plates having granulated, spongy, porous, or equivalent lead secured thereto, substantially as hereinbefore explained, and connect them with one pole of a battery and another plate with the opposite pole. A current of electricity is then passed through the apparatus, transforming the oxide of lead on the several plates connected to one pole to peroxide of lead. The plates are then placed in a vessel filled with dilute sulphuric acid, equal numbers of the plates being connected with the opposite poles, and a current is then passed through the apparatus, which has the effect of reducing the peroxide of lead on the plates attached to one pole to spongy metallic lead, and in this condition the plates are in condition for use.

I do not limit myself to this particular method of forming or charging the elements or plates; but it is one that may be employed with good results.

The granular, or spongy, or porous lead referred to may be prepared by chemical or electrical reduction or by mechanically subdividing metallic lead.

This application is a division of my application designated as "Case I," filed June 13, 1881, in which other features of my invention are claimed. For convenience in distinguishing this invention among others of mine in the class of secondary batteries I have denominated it "Case I, Division A."

Having fully described my invention, what

I claim as new, and desire to secure by Letters Patent, is—

In a secondary battery, an element consisting of a structure of etagère-like form, containing in the spaces between its shelves lead in a finely-divided state, substantially as set forth.

In testimony whereof I have signed my name to this specification in the presence of two subscribing witnesses.

CHARLES F. BRUSH.

Witnesses:
LEVERETT L. LEGGETT,
ELBERT H. BAKER.